United States Patent
Karthik et al.

(10) Patent No.: US 10,287,412 B2
(45) Date of Patent: May 14, 2019

(54) PROCESS FOR THE PREPARATION OF HIERARCHICALLY MESO AND MACROPOROUS STRUCTURED MATERIALS

(71) Applicant: CIC ENERGIGUNE, Minano, Alava (ES)

(72) Inventors: Mani Karthik, Álava (ES); Abdessamad Faik, Álava (ES); Stefania Doppiu, Álava (ES)

(73) Assignee: CIC Energigune, Minano (ES)

(*) Notice: Subject to any disclaimer, the term of this patent is extended or adjusted under 35 U.S.C. 154(b) by 188 days.

(21) Appl. No.: 14/437,000

(22) PCT Filed: Oct. 17, 2013

(86) PCT No.: PCT/EP2013/071705
§ 371 (c)(1),
(2) Date: Apr. 20, 2015

(87) PCT Pub. No.: WO2014/060508
PCT Pub. Date: Apr. 24, 2014

(65) Prior Publication Data
US 2015/0284252 A1    Oct. 8, 2015

(30) Foreign Application Priority Data
Oct. 18, 2012  (EP) .................................. 12382401

(51) Int. Cl.
*C08J 3/24* (2006.01)
*C08J 9/42* (2006.01)
(Continued)

(52) U.S. Cl.
CPC ................. *C08J 9/42* (2013.01); *B29C 35/02* (2013.01); *B29C 71/02* (2013.01); *C01B 32/00* (2017.08);
(Continued)

(58) Field of Classification Search
CPC ........ C08J 9/42; C08J 3/247; C08J 2205/048; C01B 31/02
See application file for complete search history.

(56) References Cited

U.S. PATENT DOCUMENTS

2007/0154381 A1* 7/2007 Miller ................ C04B 38/0032
423/445 R
2010/0297389 A1* 11/2010 Dai ........................ C01B 31/00
428/118

FOREIGN PATENT DOCUMENTS

WO    2007076469 A2    7/2007
WO    2010019221 A1    2/2010

OTHER PUBLICATIONS

Yunpu Zhai et al.; "Carbon Materials for CHemical Capacitive Energy Storage", Advanced Materials, 2011, pp. 4828-4850, 23, Wiey-VCH Verlag GmbH & Co. KGaA, Weinheim.
(Continued)

*Primary Examiner* — Hai Vo
(74) *Attorney, Agent, or Firm* — Jason P. Mueller; Adams and Reese LLP (57) ABSTRACT

The present invention describes a hierarchical graphitized carbon foam comprising an interconnected macroporous structure with an ordered mesoporous wall structure, a process for its preparation, as well as to a process for the synthesis of a variety of bimodal porous organic polymer and/or inorganic metal oxide materials.

13 Claims, 8 Drawing Sheets

(51) Int. Cl.
  *B29C 35/02* (2006.01)
  *B29C 71/02* (2006.01)
  *B29K 23/00* (2006.01)
  *B29L 31/00* (2006.01)
  *C01B 32/00* (2017.01)
  *C01B 32/05* (2017.01)
  *C04B 38/00* (2006.01)
  *C04B 38/06* (2006.01)
  *C04B 35/524* (2006.01)

(52) U.S. Cl.
  CPC ............ *C01B 32/05* (2017.08); *C04B 38/067* (2013.01); *C08J 3/247* (2013.01); *B29K 2023/00* (2013.01); *B29L 2031/772* (2013.01); *C08J 2201/026* (2013.01); *C08J 2205/048* (2013.01); *C08J 2375/04* (2013.01); *C08J 2471/02* (2013.01); *Y10T 428/249921* (2015.04)

(56) References Cited

OTHER PUBLICATIONS

An-Hui Lu et al.; "Chemical Synthesis of Carbon Material With Intriguing Nanostructure and Morphology", Macromolecular Chemistry and Physics, 2012, pp. 1107-1131, 213, Wiey-VCH Verlag GmbH & Co. KGaA, Weinheim.

Chengdu Liang et al.; "Mesoporous Carbon Materials: Synthesis and Modification", Angewandte Chemie, 2008, pp. 3696-3717, 47, Wiey-VCH Verlag GmbH & Co. KGaA, Weinheim.

Andreas Stein; "Advances in Microporous and Mesoporous Solids—Highlights of Recent Progress", Advanced Materials, 2003, pp. 763-775, 15, Wiey-VCH Verlag GmbH & Co. KGaA, Weinheim.

Zhong-Yong Yuan et al.; "Insights into Hierarchically Meso-Macroporous Structred Materials", Journal of Materials Chemistry, 2006, pp. 663-677, 16, The Royal Society of Chemistry.

Chunfeng Xue et al.; "Evaporation-Induced Coating and Self-Assembly of Ordered Mesoporous Carbon-Silica Composite Monoliths with Macroporous Architecture on Polyurethane Foams", Advanced Functional Materials, pp. 3914-3921, 18, Wiey-VCH Verlag GmbH & Co. KGaA, Weinheim.

Chunfeng Xue et al: "Famile fabrication of hierarchically porous carbonaceous monoliths with ordered mesostructure via an organic-organic self-assembly", Nano Research, Tsinghua University Press, CN, vol. 2, No. 3, Mar. 8, 2009, (Mar. 8, 2009), pp. 242-253, XP002551124, ISSN: 1998-0124, DOI: 10.1007/S12274-009-9022-Y whole document.

Liu L et al: "A low-temperature autoclaving route to synthesize monolithic carbon materials with an ordered mesostructure", Carbon Jun. 2010 Elsevier LTD GBR, vol. 48, No. 7, Jun. 2010 (Jun. 2010), pp. 2089-2099, XP002694861, DOI: 10.1016/J.Carbon.2010.02.022 abstract *p. 2090, right-hand column, 2.1. Synthesis*.

Meng Y et al: "A family of highly ordered mesoporous polymer resin and carbon structures from organic-organic self-assembly", Chemistry of Materials, American Chemical Society, Washington, US, vol. 18, No. 18, Sep. 5, 2006 (Sep. 5, 2006), pp. 4447-4464, XP002504189, ISSN: 0897-4756, DOI: 10.1021/CM060921U abstract p. 4449, left-hand column, 1st paragraph.

* cited by examiner

PROCESS FOR THE PREPARATION OF HIERARCHICALLY MESO AND MACROPOROUS STRUCTURED MATERIALS

FIELD OF THE INVENTION

The present invention relates to a process for the preparation of hierarchically meso-macroporous structured materials, in particular a new highly graphitized carbon foam having interconnected macroporous architecture with ordered mesoporous walls, as well as its use in many technical fields, such as energy harvesting, storage and conversion, advanced electronics, sensing, adsorption, purification and catalysis.

BACKGROUND

The hierarchical porous carbons, those whose pore architecture is composed of large macroporous with additional mesoporous within the frameworks, have attracted much research attention because of their potential applications in many research fields such as catalysis, adsorbents, coating, sensors, separation and chemical filtration, microelectronics, electro-optics, supercapacitors, environmental engineering, insulators, biomaterials engineering and other energy-related applications. In this regard, several research approaches have already been done for the fabrication of macroporous with mesoporous (bimodal) carbon materials, as well as bimodal carbon composites, which are well summarized in several review articles [Yunpu Zhai et al., Advanced Materials, 2011, 23, 4828-4850; An-Hui Lu et al., Macromolecular Chemistry Physics, 2012, 213, 1107-1131; Chengdu Liang et al., Angewandte Chemie International Edition, 2008, 47, 3696-3717; A. Stein, Advanced Materials, 2003, 15, 763-775; Z. Y. Yuan and B. L. Su, J. Material Chemistry, 2006, 16, 663-677]. These bimodal carbon materials have advantages over the unimodal carbon materials (mesoporous or macroporous carbon) in terms of diffusion efficiency, high surface area and good conductivity.

However, it has been observed from the literature that most of the research articles have mainly been focused on the preparation of macroporous with mesoporous carbon materials with different forms like carbon powders, aerogel powder or particles, micro/macro-spheres, fibers and graphite powder [W. Sui et al., Materials Letters, 2011, 65, 2534-2536; Z. Wang et al., Carbon, 2008, 46, 1702-1710; C-H. Huang et al., Carbon, 2011, 49, 3055-3064; S. Lu and Y. Liu, Applied Catalysis B: Environmental, 2012, 111-112, 492-501; X. Lu et al., J. Chem. Biosensors and Bioelectronics, 2009, 25, 244-247]. The small particles, as well as powder forms, of the carbon materials might limit the applicability of these materials because these materials can create a high pressure drop.

Therefore, the research of carbon foams has become attractive to many researchers because of their unique characteristics such as very high porosity with interconnected porous network, low density, low pressure drop and high thermal conductivity which make it useful for various potential applications [J. Song et al., New Carbon Materials, 2012, 27 (1), 27-34; R. Narasimman and K. Prabhakaran, Carbon, 2012, 50, 1999-2009]. Their application includes thermal management, electrodes, catalyst supports, high temperature insulation, ablative materials, etc.

The carbon foams are mainly classified into three categories such as reticulated vitreous carbon foams (RVC), non-graphitic carbon foams and graphitic carbon foams. Reticulated vitreous carbon (RVC) as well as non-graphitic carbon foams are prepared by foaming and calcination of natural or synthetic polymers [S. Lei et al, Carbon, 2010, 48, 2644-2646; S. Zhang et al., New Carbon Materials, 2010, 25, 9-14]. On the other hand, graphitic carbon foams are generally prepared by foaming of coal, coal tar pitch and petroleum pitch followed by high temperature calcination and graphitization [M. Wang et al., Carbon, 2008, 46, 84-91; Z. Min et al., New Carbon Materials, 2007, 22, 75-79]. The graphitized porous carbon has high conductivity, well-aligned crystalline structure and good thermal stability.

All these methods for preparing RVC, non-graphitic carbon foams and graphitic carbon foams use different raw materials (precursors) and different synthetic conditions. For example, the first pitch based macroporous graphite foam was developed by Oak Ridge National Laboratory (ORNL) in 1997. Klett et al. [Carbon, 2000, 38, 953-973 and U.S. Pat. No. 6,033,506] found that the effective thermal conductivity of graphite foam was more than 150 W/m·K which was higher than the value of aluminium foam (ca. 2-26 W/m·K). On the other hand, the density of the graphite foam was 0.2-0.6 g/cm3 which was only ⅕ of that of aluminium foam. This macroporous carbon foam developed by ORNL is believed to be less expensive and easy to fabricate than the traditional foams. But this graphite foam only has a high thermal conductivity in a certain direction and it also has very high pressure drop due to the small scale pores and complex structure of the foam [A. G. Straatman et al., J. Engineering for Gas Turbines and Power, 2007, 129, 326-330].

WO2007/076469 describes a method for preparing a graphitic macroporous carbon foam with improved graphitizability by introducing a graphitization promoting additive into the carbon foam. However, high graphitization temperatures, i.e. between 2000 and 2600° C., are required.

In addition to that, the syntheses of macro/mesoporous silica and carbon monoliths have been explored by several authors [S. Alvarez and A. B. Fuertes, Materials Letters, 2007, 61, 2378-2381; H. Maekawa et al., Advanced Materials, 2003, 15, 591-596]. The first ordered mesoporous carbon-silica composite monoliths with macroporous architecture by using polyether polyol-based polyurethane (PU) foam as a sacrificial template was achieved by Xue et al [Chunfeng Xue et al, Advanced Functional Materials, 2008, 18, 3914-3921].

Based on the above process for obtaining ordered mesoporous carbon-silica composite monoliths with macroporous architecture, Xue et al. (Nano Research, 2009, 2, 242-253) also discloses a process for the synthesis of hierarchically porous carbon foams with ordered mesostructure that comprises the use of a macroporous monolithic template of polyurethane (PU) foam which is coated with an ethanol solution containing the carbon precursor (e.g. resol) and a triblock copolymer (e.g. Pluronic F127). After self-assembly of the carbon precursor and the copolymer in the PU foam, solvent evaporation is carried out according to a process known as EISA (evaporation induced self-assembly), followed by thermopolymerization, calcination and carbonization to yield the hierarchically porous carbon foam. However, the EISA method is not suitable for the up-scaling due to the need for large surface substrate discs and long-time solvent evaporation.

In spite of the hierarchically porous carbons described in the art, graphitized macroporous carbon foams with ordered mesopores on the walls have not yet been reported.

BRIEF DESCRIPTION OF THE INVENTION

The authors of the present invention have developed a new carbon foam having a graphitic nature with a bimodal pore distribution, with a higher specific surface area, lower density and higher porosity, which provides a higher electrical and thermal conductivity and an improved stability, thus making this foam very useful for many applications in different technical fields such as energy harvesting, storage and conversion, advanced electronics, sensing, adsorption, purification, catalysis, etc.

In addition to that, unlike traditional foaming techniques which require the use of blowing agents or oxidative stabilization or other techniques based on the use of a sacrificial template in which an evaporation induced self-assembly (EISA) is conducted to form the foam precursor with the disadvantages mentioned above, a process for making this carbon foam has been developed which provides a foam with improved thermal properties, which allows the implementation in large scale industrial production.

Furthermore, by the process of the invention a carbon foam with a high degree of graphitization can be obtained at temperatures around 1000° C. or below as compared with traditional graphitization processes in which graphitization temperatures ranging from 2000 to 2600° C. are required.

In fact, the comparative data provided in the present application have shown that the process of the invention provides a graphitized carbon foam with improved properties as compared to a graphitized carbon foam obtained from a process which includes a EISA method (such as that mentioned by Xue et al. in Nano Research, 2009, 2, 242-253) and a graphitization method as that described in WO2007//076469.

The versatility and reproducibility of the process of the invention allows its application for the fabrication of different type of bimodal materials, other than carbon materials, such as organic polymer, ceramic and/or inorganic metal oxides materials.

Thus, a first aspect of the present invention refers to a hierarchical graphitized carbon foam comprising an interconnected macroporous structure with ordered mesoporous wall structure, further characterized in that the carbon foam has a surface area higher than 400 m²/g.

Another aspect of the invention relates to a process (from now onwards process 1 of the invention) for preparing a hierarchical graphitized carbon foam as defined above, wherein said process comprises:
a) forming a solution comprising a phenolic resin and a poly(alkylene oxide) compound;
b) impregnating a polymeric foam with the solution obtained in step a);
c) conducting a self-assembly of the phenolic resin and the polyalkylene oxide compound in the polymeric foam by a hydrothermal treatment;
d) subjecting the product obtained in step c) to a heating process to thermally crosslink the phenolic resin;
e) subjecting the product obtained in step d) to a carbonization process to remove the polyalkylene oxide compound and the polymeric foam and to form a carbonized carbon foam;
f) subjecting the carbonized carbon foam obtained in step e) to a catalytic graphitization.

A further aspect of the invention refers to a hierarchical graphitized carbon foam obtainable by a process as defined above.

A further aspect of the invention relates to the use of a hierarchical graphitized carbon foam as defined above for the preparation of adsorption-separation filters, catalytic converters, heat exchangers, heat sinks and thermal and electrical energy storage devices.

Finally, another aspect of the present invention relates to a process (from now onwards process 2 of the invention) for the preparation of a macro and meso-porous structured material, said process comprising:
a) forming a solution comprising a precursor of the macro and meso-porous structured material and a poly(alkylene oxide) compound;
b) impregnating a polymeric foam with the solution obtained in step a);
c) subjecting the impregnated polymeric foam to a hydrothermal treatment to self-assembly the precursor of the macro and meso-porous structured material with the poly(alkylene oxide) compound in the polymeric foam.

DETAILED DESCRIPTION OF THE INVENTION

Hierarchical Graphitized Carbon Foam

The hierarchical graphitized carbon foam of the invention has a bimodal pore distribution, understanding as such a combination of two average pore sizes, with the primary fraction being the macropores and the minor fraction being the mesopores. In particular, the carbon foam has an interconnected macroporous structure with an ordered mesoporous wall structure.

By the term "interconnected macroporous structure" it is understood a structure formed by macropores having an average size of at least 50 nm, which are interconnected so as to form an open cell structure.

By the term "ordered mesoporous wall structure" it is understood a regular repeating geometrical arrangement, wherein the mesopores are regularly distributed within the external and internal walls of the macropores and wherein the mesoporous have a size varying from 2 to 50 nm.

The hierarchical graphitized carbon foam of the invention is further characterized in that the surface area thereof is higher than 400 m²/g, more preferably higher than 440 m²/g.

In a particular embodiment, the carbon foam has a total porosity from about 65% to about 95%, more preferably from about 70% to about 95%.

In a preferred embodiment, at least about 90% of the total pore volume, more preferably at least about 95% of the total pore volume corresponds to the macroporous fraction, whereas at least 1% of the total pore volume, more preferably from about 2% to about 10% of the total pore volume corresponds to the mesoporous fraction.

In another preferred embodiment, the macroporous fraction of the bimodal distribution in the carbon foam has an average size of at least 50 nm, more preferably from 50 μm to 1 mm, even more preferably from 50 μm to 700 μm.

In another preferred embodiment, the mesoporous fraction of the bimodal distribution in the carbon foam has an average size from 2 to 50 nm, more preferably from 2 nm to 10 nm, even more preferably between 3.5 and 4 nm. Preferably, the mesoporous volume is equal or higher than 0.20 $cm^3/g$, more preferably between 0.20 and 1.00 $cm^3/g$, even more preferably between 0.30 and 1.00 $cm^3/g$.

All these features provide a graphitized carbon foam with higher electrical and thermal conductivity, being thermally stable even at temperatures higher than 500° C.

In a particular embodiment, the carbon foam of the invention has a relatively uniform distribution of macroporous and mesoporous in order to provide a suitable compressive strength. In addition to that, the pores, both macroporous and mesoporous, are relatively isotropic, by which is meant that the pores are relatively spherical, meaning that the pores have, on average, an aspect ratio from about 1.0 (which represents a perfect spherical geometry) to about 1.5. The aspect ratio is determined by dividing the longer dimension of any pore with its shorter dimension.

Process 1

Another aspect of the invention relates to a process for preparing a hierarchical graphitized carbon foam as defined above, wherein said process comprises:
 a) forming a solution comprising a phenolic resin and a polyalkylene oxide compound;
 b) impregnating a polymeric foam with the solution obtained in step a);
 c) conducting a self-assembly of the phenolic resin and the polyalkylene oxide compound in the polymeric foam by a hydrothermal treatment;
 d) subjecting the product obtained in step c) to a heating process to thermally crosslink the phenolic resin;
 e) subjecting the product obtained in step d) to a carbonization process to remove the polyalkylene oxide compound and the polymeric foam and to form a carbonized carbon foam;
 f) subjecting the carbonized carbon foam obtained in step e) to a catalytic graphitization.

The first step of the process 1 of the invention includes the formation of a solution comprising a phenolic resin or a phenolic pre-polymer and a polyalkylene oxide compound.

By the term "phenolic resin or phenolic pre-polymer" it is understood the product resulting from the reaction of phenol, or a substituted phenol, with an aldehyde, in the presence of an acidic or basic catalyst. This phenolic resin is the carbon precursor of the resulting graphitized carbon foam obtained after conducting the process 1 of the invention.

Any phenol of the kind which is able to form condensation products with aldehydes can be used. Such phenols include monohydric and polyhydric phenols, such as pyrocatechol, resorcinol, hydroquinone or phloroglucinol; monoalkyl or polyalkyl substituted phenols, such as cresols or xylenols, including for example 2-, 3- or 4-methyl phenol, 2,3-, 2,4-, 2,5- or 2,6-dimethyl phenol, 3,4-, 3,5-dimethyl phenol, 2,3,5-trimethyl phenol; monoacyl or polyacyl substituted phenols, i.e. those phenols substituted with one or more acyl groups; monoalkoxyl or polyalkoxyl substituted phenols, i.e., those phenols substituted with one or more alkoxyl group, such as 3-methoxy phenol, 3,5-dimethoxy phenol, 5-methoxy resorcinol; halogen-substituted phenols, those substituted with fluorine, bromine, chlorine or iodine, more preferably those substituted with fluorine, such as, 2-fluorophenol, 3-fluorophenol or 4-fluorophenol; polynuclear monohydric or polyhydric phenols, such as naphthols, p,p'-dihydroxydiphenyl dimethyl methane or hydroxyanthracenes.

In a preferred embodiment, the phenol is selected from pyrocatechol, resorcinol, hydroquinone or a halogen-substituted phenol. All of them are more reactive than phenol and can lead to some cross-linking at the pre-polymer production stage. Pyrocatechol, resorcinol and hydroquinone can increase the oxygen functionality of the resins, whereas halogen-substituted phenol, such as 2-fluorophenol, 3-fluorophenol and 4-fluorophenol, provide carbon foams functionalized with fluorine.

The phenols used to make the foam starting material can also be used in admixture with non-phenolic compounds which are able to react with aldehydes in the same way as phenol. These compounds include nitrogen containing nucleophilic compounds that are reactive in polycondensation reactions, such as urea, aromatic (aniline) and heteroaromatic (melamine) amines. These allow the introduction of specific types of nitrogen functionality into the initial polymer (and final carbon) and influence the development of the mesoporous structure of both the resins and the final carbons.

Like hydroquinone and resorcinol, all the nitrogen containing nucleophilic compounds which can be used in the present invention possess two or more active sites and are more reactive in condensation reaction than phenol. It means that they are first to react with primary cross-linking agents forming secondary cross-linking agents in situ. In the case of melamine, it is preferable to prepare the secondary cross-linking agent, hydroxymethylated melamine, in advance.

In another preferred embodiment, the aldehyde includes any suitable aldehyde which reacts with phenols in the same manner, for example, formaldehyde, acetaldehyde or benzaldehyde. More preferably the aldehyde is formaldehyde.

In general, the phenols and aldehydes which can be used in the process of the invention are those described in U.S. Pat. Nos. 3,960,761 and 5,047,225, which are incorporated herein by reference.

The phenol pre-polymer can also be a Novolac resin. Novolac resins are typically produced by the acid catalyzed condensation of phenol and formaldehyde in approximately equimolar amounts. Novolacs are essentially linear chains with molecular weights of from 500 to 2000 D, where phenolic moieties are linked with methylene (predominantly) and methylene ether bridges and possess one nucleophilic active site, predominantly in the unsubstituted ortho-position to hydroxyl group. There can be also varying degrees of chain branching depending upon the production conditions.

The reaction of phenol, or a substituted phenol, with an aldehyde, is catalyzed by an acid or base at a aldehyde: phenol ratio which can vary depending on the functionality of the phenol. Preferably, the reaction is catalyzed by hydrochloride, sodium hydroxide or sodium carbonate.

The amount of the phenolic resin in the solution used for the impregnation stage (step b) of the process 1 of the invention) can be adjusted as a function of the diameter of the macropores which it is desired to obtain in the carbon foam on conclusion of the process, it being understood that the lower this amount, the grater the diameter of the macroporous and the finer the internal junctions (walls of the macropores).

Generally, the amount of carbon precursor within the solution varies from 5 to 90% by weight, preferably from 20 to 70% by weight, with respect to the total weight of said solution.

The poly(alkylene oxide) compound is used as structure-directing agent and is the responsible of generating the ordered mesoporous wall structure within the macroporous structure. This compound is typically an amphiphilic poly(alkylene oxide) block copolymer. Preferably, the block copolymer is a triblock copolymer containing segments of poly(ethylene oxide) (hydrophilic) and poly(propylene oxide) (hydrophobic) in such a way that the poly(ethylene oxide) is covalently bond with the opposite ends of the poly(propylene oxide) according to the following formula:

Suitable triblock copolymers are Pluronic F127 ($EO_{106}PO_{70}EO_{106}$), Pluronic F123 ($EO_{20}PO_{70}EO_{20}$) or Pluronic F108 ($EO_{132}PO_{50}EO_{132}$).

The solvent used to prepare the solution of step a) is preferably water or a mixture of water with at least one organic solvent selected from lower alcohols, such as ethanol, methanol, propanol, iso-propanol or butanol; dimethylformamide (DMF), dimethyl sulfoxide (DMSO), tetrahydrofuran (THF), toluene and their mixtures. In a preferred embodiment, the solvent is a mixture of water and ethanol.

In a particular embodiment, the solution comprising the phenolic resin and the polyalkylene oxide compound is prepared by first dissolving the phenol, or the substituted phenol, and the polyalkylene oxide compound in the solvent. In a subsequent step, the acidic or base catalyst is added to said solution and after that, the aldehyde is also added to the solution until a homogenous solution is obtained.

In a particular embodiment, the molar composition of the compounds used to form the solution is:
phenol, or substituted phenol: 1
aldehyde: 0.5-3
poly(alkylene oxide): 0.005-0.05
organic solvent: 10-40
water: 50-100

Once the solution comprising the phenolic resin and the polyalkylene oxide compound is prepared, this is used to impregnate a polymeric foam according to the second step of the process 1 of the invention.

This polymeric foam is used as macrostructure sacrificial template or scaffold and provides a 3D interconnecting macroporous architecture with large voids and interfaces for the self-assembly of the ordered mesostructure.

As polymeric foam, a polyurethane, polystyrene, polyethylene or polypropylene foam can be used. In a preferred embodiment, the polymeric foam is a polyurethane foam.

The impregnation of the polymeric foam with the solution obtained in step a) can be carried out by spraying, brushing or pouring the solution onto or over the foam or by complete immersion of the foam into the solution for a period of time.

When the polymeric foam is impregnated with the carbon precursor solution, the phenolic resin and the poly(alkylene oxide) compound, together with the solvent, are infused into the interconnecting 3D networks and large macropore voids by capillarity and wetting driving forces.

In order to fully fill up the macropore voids of the polymeric foam, a squeezing process to remove the air babbles inside the foam can be carried out.

The third step of the process of the invention involves the self-assembly of the phenolic resin and the polyalkylene oxide compound to form a uniform layer of the ordered mesostructured phenolic resin on the 3D interconnecting macropores of the polymeric foam.

The thickness of the layer depends on the concentration of the phenolic resin, however, in a preferred embodiment, the thickness is less than 20 μm.

A possible mechanism that leads to the formation of ordered carbon mesostructures into the macroporous structure is described below.

The hydroxyl groups of the phenolic compound interact with the alkylene oxide moieties of the poly(alkylene oxide) compound, giving rise to the cross-linking of the interpolymer chains by hydrogen bonding. The interpolymer-chain hydrogen bonding cross-links the poly(alkylene oxide) and thereby stabilize the micelle structures in which the phenolic resin is enriched inside the alkylene oxide domains. The resulting compounds then self-assembly according to the mesoscopic ordering directed principally by the phase separation of the poly(alkylene oxide) species.

The self-assembly of the phenolic resin and the polyalkylene oxide compound is performed by a hydrothermal treatment.

In a particular embodiment, this hydrothermal treatment can be conducted at autogeneous pressure which corresponds to the saturated vapor pressure of the carbon precursor solution.

The temperature applied in the hydrothermal process ranges from about 40 to about 200° C., more preferably form 40 to 100° C., even more preferably at about 50° C. A skilled person will know how to adapt the temperature depending on the composition of the carbon precursor solution.

Said hydrothermal process is preferably conducted in an autoclave, such as for example in a polypropylene bottle or stainless steel autoclave or Teflon-lined autoclave, keeping the autoclave in a hot air oven which is heated at the temperature required by the process.

During the hydrothermal treatment, the temperature and pressure are holding in the autoclave for generally about 1 to 4 days. After finishing the holding period, a coated polymeric foam is obtained and then the solvent can be easily removed due to the improved drying performance of the resulting product.

This hydrothermal treatment offers many advantages with respect to the conventional evaporation induced self-assembly (EISA) method at room temperature. From the environmental concern, hydrothermal processes are more environmentally benign since the waste solvents can be recycled. In addition to that, the process is more economic since it requires a conventional and easy method to separate the product from the solvents, in contrast to the EISA method which requires the solvents to be evaporated at room temperature. Thus, the hydrothermal treatment allows the implementation of the process of the invention in a large-scale industrial production.

Furthermore, as shown in the examples below, the hydrothermal treatment contributes to the formation of a carbon foam with better thermal and electrical conductivity, as well as thermal stability, as a result of providing a carbon foam with higher surface area and higher porosity.

In addition to that, the hydrothermal treatment contributes to the reduction of the graphitization temperature in the subsequent graphitization step that leads to the formation of the graphitized carbon foam of the invention.

Separation of the impregnated foam from the carbon precursor solution may be accomplished by filtration, decantation or other physical separation techniques known to those skilled in the art.

In a subsequent step, the coated foam obtained after conducting step c) of the process 1 of the invention, is subjected to a heating process in order to thermally cross-link the phenolic resin.

In a particular embodiment, when formaldehyde is used in the production of the phenolic resin, it cross-links phenolic moieties forming —$CH_2$— bridges in strong acidic and strong alkali media.

In a preferred embodiment, the heating process is conducted at a temperature ranging from 70 to 100° C., more preferably at about 80° C.

Said heating process can be carried out in a conventional oven.

In order to convert the coated polymeric foam to a carbon foam, said coated foam is then subjected to a carbonization process according to the step e) of the process 1 of the invention. In particular, this step provides a non-graphitizing amorphous carbon foam.

By "carbonization" it is understood the heating of the impregnated polymeric foam to a temperature above the thermal decomposition temperature of the poly(alkylene oxide) compound and the polymeric foam whereby they are substantially converted to gaseous materials.

In a preferred embodiment, the carbonization process is carried out by heating the impregnated foam to a temperature of from about 500° C. to about 1000° C., in an inert or air-excluded atmosphere, such as in the presence of nitrogen or argon. More preferably, the temperature to be applied ranges between 600 and 800° C., even more preferably is about 800° C.

The heating rate should be controlled in order to avoid as much as possible the shrinkage of the polymeric foam during carbonization. However, due to the presence of mesopores in these materials, which provide efficient escape routes for the volatile products, the heating rates employed can be from 0.5° C. to 10° C. per minute.

In addition to that, care should be taken to ensure uniform heating of the polymeric foam for effective carbonization.

During carbonization, the poly(alkylene oxide) and the polymeric foam template are removed. The ordered mesoporous resin is yielded on the surface of the macroporous of the polymeric foam. The primitive macroporous architecture with the 3D interconnecting macroporous is retained during this step.

The last step of the process of the invention refers to a catalytic graphitization process wherein the macro and mesoporous amorphous carbon foam obtained after the carbonization step is converted in a graphitized macro and mesoporous carbon foam.

Although the amorphous carbon foam obtained in the previous step can be converted into a graphitized carbon foam by conventional high temperature (ca. 2500-3000° C.) graphitization techniques, the graphitization step of the process of the invention is carried out in the presence of heterogeneous catalysts at relatively low temperatures in order to minimize the energy consumption.

By using said heterogeneous catalysts, the graphitization step can be carried out at a temperature ranging from 700 to 1000° C.

In a particular embodiment, the heterogeneous catalyst is selected from Fe, Co, Ni, Mn and salt thereof.

In another particular embodiment, the catalytic graphitization step is conducted by impregnating the carbonized macro and mesoporous carbon foam with a solution of metal nitrates in a solvent, such as ethanol. By this method, metal species in the ethanol medium can be easily absorbed on the high surface area of carbon (hydrophobic surface) which contributes to enhance the degree of graphitization. The impregnated carbonized macro and mesoporous carbon foam is then subjected to graphitization by heating at a temperature between 700° C. and 1000° C. in an inert or air-excluded atmosphere, such as in the presence of nitrogen or argon.

A further aspect of the invention relates to a hierarchical graphitized carbon foam obtainable by the process 1 of the invention as defined above.

The graphitized carbon foam obtainable by the process of the invention is characterized for having an unexpected high degree of graphitization which is attributed to the addition of the catalyst in the final graphitization step, as well as to the structural morphology/character of the carbonized carbon foam which is obtained through the hydrothermal treatment in the step c) of the process.

Furthermore, the carbon material obtained after conducting the hydrothermal treatment shows improved physicochemical properties, such as higher surface area, higher pore volume and lower average pore size, when compared to other carbon foams obtained through other procedures known in the art, as pointed out by the experimental data provided in the examples of the present invention.

Therefore, both steps of hydrothermal treatment and subsequent addition of a catalyst in the graphitization step are the key aspects of the process of the invention to obtain a hierarchically macro/mesoporous carbon foam with improved properties as well as with a high degree of graphitization.

The hierarchical carbon foam of the invention can be used in a multiple industrial applications. In particular, it can be used in the elaboration of adsorption-separation filters, insulators, catalytic converters, heat exchangers, heat sinks and thermal and electrical energy stores. In particular, it can be used in the manufacture of hydrogen storage devices, of supercapacitors or of electrodes, such as, for example, of negative electrodes in lithium or sodium batteries or of macroporous conducting electrodes which can be used in electrocatalysis; in carrying out chemical reactions catalyzed in a heterogeneous phase or in the manufacture of enzymatic sensors or biofuel cells, that is to say of cells in which the cathode and the anode are made from the foam material in accordance with the present invention.

Process 2

Due to the simplicity, versatility and reproducibility of the process 1 of the invention, it can be applied for the fabrication of different type of bimodal materials, other than carbon materials, such as organic polymer, ceramic and/or inorganic metal oxides materials, adapting some of the steps of the above mentioned process.

Therefore, another aspect of the invention relates to a process for the preparation of a macro and meso-porous structured material, said process comprising:
 a) forming a solution comprising a precursor of the macro and meso-porous structured material and a poly(alkylene oxide) compound;
 b) impregnating a polymeric foam with the solution obtained in step a);

c) subjecting the impregnated polymeric foam to a hydrothermal treatment to self-assembly the precursor of the macro and meso-porous structured material and the poly(alkylene oxide) compound in the polymeric foam, at a autogeneous pressure and at a temperature ranging from 40 to 200° C.

The first step of the process 2 of the invention includes the formation of a solution comprising a precursor of the macro and meso-porous structured material to be obtained and a poly(alkylene oxide) compound.

In a preferred embodiment, the macro and meso-porous structured material is selected from a macro and meso-porous structured organic polymer material, a macro and meso-porous structured ceramic material and a macro and meso-porous structured inorganic metal oxide.

When the macro and meso-porous structured material is a macro and meso-porous structured organic polymer material, the precursor of the macro and meso-porous structured material is a organic polymer precursor.

When the macro and meso-porous structured material is a macro and meso-porous structured ceramic polymer material, the precursor of the macro and meso-porous structured material is a ceramic precursor.

When the macro and meso-porous structured material is a macro and meso-porous structured inorganic metal oxide, the precursor of the macro and meso-porous structured material is an inorganic metal oxide precursor.

In a particular embodiment, the organic polymer precursor is selected from phenolic resins, such as those mentioned above, styrene, divinylbenzene, polysaccharides, such as sucrose and its derivatives, potato starch, lignin, lignin/cellulose mixtures and petroleum pitches.

The organic polymer precursors can be provided in the form of monomers, oligomers, preformed macromonomers or of polymers which are polymerized and/or cross-linked during step c) or during a subsequent step by subjecting them to a heating process.

In a preferred embodiment, the organic polymer precursor is a phenolic resin, i.e., the product resulting from the reaction of phenol, or a substituted phenol, with an aldehyde, in the presence of an acidic or basic catalyst.

More preferably, a substituted phenol is used and includes monohydric and polyhydric phenols, such as pyrocatechol, resorcinol, hydroquinone or phloroglucinol; monoalkyl or polyalkyl substituted phenols, such as cresols or xylenols, including for example 2-, 3- or 4-methyl phenol, 2,3-, 2,4-, 2,5- or 2,6-dimethyl phenol, 3,4-, 3,5-dimethyl phenol, 2,3,5-trimethyl phenol; monoacyl or polyacyl substituted phenols, i.e. those phenols substituted with one or more acyl groups; monoalkoxyl or polyalkoxyl substituted phenols, i.e., those phenols substituted with one or more alkoxyl group, such as 3-methoxy phenol, 3,5-dimethoxy phenol, 5-methoxy resorcinol; halogen-substituted phenols, those substituted with fluorine, bromine, chlorine or iodine, more preferably those substituted with fluorine, such as, 2-fluorophenol, 3-fluorophenol or 4-fluorophenol; polynuclear monohydric or polyhydric phenols, such as naphthols, p,p'-dihydroxydiphenyl dimethyl methane or hydroxyanthracenes.

In a preferred embodiment, the substituted phenol is selected from pyrocatechol, resorcinol, hydroquinone or a halogen-substituted phenol.

In another preferred embodiment, the aldehyde includes any suitable aldehyde which reacts with phenols in the same manner, for example, formaldehyde, acetaldehyde or benzaldehyde. More preferably the aldehyde is formaldehyde.

In another particular embodiment, the ceramic precursor is selected from preceramic polymers resulting in oxycarbonitrides or in carbonitrides, nitrides or boronitrides of carbon which are optionally metallic, among which may in particular be mentioned polyaminoborazines and their derivatives and polycarbazides and their derivatives.

In another particular embodiment, the macro and meso-porous structured inorganic metal oxide is selected from $TiO_2$, $ZrO_2$, $Nb_2O_5$, $Ta_2O_5$, $Al_2O_3$, $SiO_2$, $WO_3$, $SnO_2$, $HfO_2$ and mixed oxides $SiAlO_{3.5}$, $SiAlO_{5.5}$, $Al_2TiO_5$, $ZrTiO_4$, $SiTiO_4$.

The metal oxide precursors can be any metallic salt of the oxide to be obtained, such as for example a metal halide. Examples of these halides include $ZrCl_4$, $TiCl_4$, $AlCl_3$, $SiCl_4$, $SnCl_4$, $NbCl_5$, $TaCl_5$, $WCl_6$, $HfCl_4$, $ZnCl_2$ and mixtures thereof.

The amount of organic polymer precursor, ceramic precursor or inorganic metal oxide precursor in the solution used for the impregnation step can be adjusted as a function of the diameter of the macropores which is desired to be obtained in the foam on conclusion of the process, it being understood that the lower this amount, the greater the diameter of the macropores and the finer the internal junctions (walls of the macropores). Generally, the amount of organic polymer precursors, or of the ceramic precursor or of the metal oxide precursor within the solution varies from 5 to 90% by weight, more preferably from 20 to 70% by weight, with respect to the total weight of the solution.

As the poly(alkylene oxide) compound, an amphiphilic poly(alkylene oxide) block copolymer as those mentioned previously, can be used. This compound also acts as structure-directing agent and is the responsible of generating the ordered mesoporous wall structure within the macroporous structure. Suitable triblock copolymers are Pluronic F127 ($EO_{106}PO_{70}EO_{106}$) Pluronic F123 ($EO_{20}PO_{70}EO_{20}$) or Pluronic F108 ($EO_{132}PO_{50}EO_{132}$).

The solvent of the solution of the precursor of the macro and meso-porous structured material and the poly(alkylene oxide) compound is preferably an organic solvent selected from lower alcohols, such as ethanol, methanol, propanol, iso-propanol or butanol; dimethylformamide (DMF), dimethyl sulfoxide (DMSO), tetrahydrofuran (THF), toluene and their mixtures. When the organic polymer precursor is a phenolic resin, the solvent can also be selected from water and mixtures of water with at least one organic solvent selected from the abovementioned solvents, in the presence of a base or an acid.

Once the solution comprising the precursor of the macro and meso-porous structured material and the poly(alkylene oxide) compound is prepared, this is used to impregnate a polymeric foam according to the second step of the process 2 of the invention.

This polymeric foam is used as macrostructure sacrificial template or scaffold and provides a 3D interconnecting macroporous architecture with large voids and interfaces for the self-assembly of the ordered mesostructure.

As polymeric foam, a polyurethane, polystyrene, polyethylene or polypropylene foam can be used. In a preferred embodiment, the polymeric foam is a polyurethane foam.

The impregnation of the polymeric foam with the solution obtained in step a) can be carried out by spraying, brushing or pouring the solution onto or over the foam or by complete immersion of the foam into the solution for a period of time.

When the polymeric foam is impregnated with any of the precursor solutions, the precursor of the macro and meso-porous structured material, and the poly(alkylene oxide) compound, together with the solvent, are infused into the interconnecting 3D networks and large macropore voids by capillarity and wetting driving forces.

In order to fully fill up the macropore voids of the polymeric foam, a squeezing process to remove the air babbles inside the foam can be carried out.

The third step of the process 2 of the invention involves subjecting the impregnated polymeric foam to a hydrothermal treatment in order to self-assembly the precursors of the macro and meso-porous structured material with the poly(alkylene oxide) compound to form a uniform layer of the ordered mesostructured precursor on the 3D interconnecting macropores of the polymeric foam.

The thickness of the layer depends on the concentration of the precursor, however, in a preferred embodiment, the thickness is less than 20 μm.

This hydrothermal treatment is conducted at autogeneous pressure which corresponds to the saturated vapor pressure of the precursor solution. The temperature applied in the hydrothermal process ranges from about 40 to about 200° C., more preferably form 40 to 100° C., even more preferably at about 50° C. A skilled person will know how to adapt the temperature depending on the composition of the precursor solution.

Said hydrothermal process is preferably conducted in an autoclave, such as for example in a polypropylene bottle or stainless steel autoclave, keeping the autoclave in a hot air oven which is heated at the temperature required by the process.

During the hydrothermal treatment, the temperature and pressure are holding in the autoclave for about 1 to 4 days. After finishing the holding period, a coated polymeric foam is obtained and then the solvent can be easily removed due to the improved drying performance of the resulting product.

A possible mechanism that leads to the formation of ordered organic polymeric mesostructures into the macroporous structure would be similar to that described above for the production of graphitized carbon foams.

In particular, when the organic polymer precursor is a phenolic resin, the hydroxyl groups of the phenolic compound interact with the alkylene oxide moieties of the poly(alkylene oxide) compound, giving rise to the cross-linking of the interpolymer chains by hydrogen bonding. The interpolymer-chain hydrogen bonding cross-links the poly(alkylene oxide) and thereby stabilize the micelle structures in which the phenolic resin is enriched inside the alkylene oxide domains. The resulting compounds then self-assembly according to the mesoscopic ordering directed principally by the phase separation of the poly(alkylene oxide) species.

On the other hand, a possible mechanism that leads to the formation of ordered inorganic metal oxide mesostructures into the macroporous structure is described below.

The alkylene oxide segments can form crown-ether type complexes with the inorganic ions through weak coordination bonds. In particular, the multivalent metal species can associate preferentially with the hydrophilic alkylene oxide moieties of the poly(alkylene oxide) compound, preferably with ethylene oxide. The resulting complexes then self-assembly according to the mesoscopic ordering directed principally by the microphase separation of the poly(alkylene oxide) species. This assembly mechanism uses poly(ethylene) oxide-metal chelating interactions in conjunction with electrostatics, van der Waals forces, etc., to direct mesostructure formation.

Separation of the impregnated foam from the precursor solution may be accomplished by filtration, decantation or other physical separation techniques known to those skilled in the art.

In a particular embodiment, the process 2 of the invention further comprises a subsequent step of polymerizing and/or crosslinking the precursors of the macro and meso-porous structured material.

Said polymerization and/or crosslinking can be carried out by any method known to a person skilled in the art.

In the case of organic polymer precursors, these are subjected to a thermally crosslinking. When the organic polymer precursor is styrene or divinylbenzene, the thermo-crosslinking is induced by a cross-linking agent, such as azo(bis)isobutyronitrile (AIBN), potassium peroxodisulfate or sodium peroxodisulfate. Said thermally crosslinking can be conducted in a conventional oven.

When the precursor is a ceramic precursor, a polymerization followed by a crosslinking is carried out, it being possible for these two operations to be induced thermally or photochemically.

When the precursor is an inorganic metal oxide precursor, a polymerization can be conducted under strongly acid conditions (e.g. pH 1), which produces a densely cross-linked, mesoscopically ordered metal oxide network.

In another particular embodiment, process 2 of the invention further comprises, after the polymerization/crosslinking step mentioned above, a step of heating/calcination the coated polymeric foam at a temperature above the thermal decomposition temperature of the poly(alkylene oxide) compound and the polymeric foam, whereby they are substantially converted to gaseous materials.

During the heating treatment, the poly(alkylene oxide) and the polymeric foam template are removed. The ordered mesoporous material is yielded on the surface of the macroporous of the polymeric foam. The primitive macroporous architecture with the 3D interconnecting macroporous is retained during this step, thus leading to foam having interconnected macroporous structure with an ordered mesoporous wall structure.

In a preferred embodiment, when the macro and meso-porous structured material to be obtained according to the process 2 of the invention is an organic polymer material, the heating treatment is carried out by heating the coated foam to a temperature of from about 300° C. to about 500° C., in an inert or air-excluded atmosphere, such as in the presence of nitrogen or argon. More preferably, the temperature to be applied ranges between 350 and 450° C., even more preferably is about 400° C.

In another particular embodiment, when the macro and meso-porous structured material to be obtained according to the process 2 of the invention is a ceramic material, the calcination is carried out by heating the coated foam to a temperature of from about 500° C. to about 1200° C., in an inert or air-excluded atmosphere, such as in the presence of nitrogen or argon.

When the heating treatment is carried out at a temperature less than or equal to 600-700° C., the ceramic foam obtained on conclusion of the process exhibits an electronically non-conducting amorphous structure.

When the heating treatment is carried out at a temperature higher than 700° C., the ceramic foam obtained on conclusion of the process exhibits a semi-graphitized structure which confers semi-conducting electronic properties on it.

In another particular embodiment, when the macro and meso-porous structured material to be obtained according to the process 2 of the invention is an inorganic metal oxide, the calcination is carried out by heating the coated foam to a temperature of from about 300° C. to about 600° C. depending on the metal component. Upon calcination, mesoporous inorganic metal oxide and mixed oxides are obtained.

The present invention will now be described by way of examples which serve to illustrate the construction and testing of illustrative embodiments. However, it will be understood that the present invention is in no way limited to the examples set forth below.

EXAMPLES

X-ray diffraction (XRD) patterns of all samples were recorded by using X-ray diffractometer (Bruker D8 Advance) equipped with nickel-filtered Cu Kα (k=1.5418 Å) radiation (30 kV, 50 mA). The diffractograms of all the samples were recorded in the 2θ range of 5-90° in steps 0.02° with a count time of 1.625 s at each point.

Nitrogen adsorption-desorption isotherms of the carbon samples of example 1 were obtained by using a Micromeritics ASAP 2020 analyzer. The Brunauer-Emmett-Teller (BET) method was utilized to calculate the specific surface areas (SBET). By using the Barett-Joyner-Halenda (BJH) model, the pore volumes and pore size distributions were derived from the adsorption branches of isotherms, and the total pore volumes (Vt) were estimated from the adsorbed amount at a relative pressure P/P0 of 0.99.

The small-angle X-ray scattering (SAXS) patterns of the carbon samples of example 1 were recorded by using a Nanostar small-angle X-ray scattering instrument (Bruker) using Cu Kα radiation (40 kV, 35 mA).

Example 1

Preparation of Graphitized Macro and Mesoporous Carbon Foam According to the Process of the Invention Resorcinol (1.65 g) and Pluronic F127 (2.5 g) were dissolved in a mixture of 20 ml of water and 20 ml of ethanol and the mixture was stirred for 15 min. Then, 0.2 g of 37 wt. % hydrochloric acid was added to the above mixture and stirred for 1 h. 2.5 g of 37 wt. % formaldehyde solution was added drop wise under stirring. The reaction mixture was further vigorously stirred for another 1 h, and a homogeneous solution was obtained. This solution was then transferred to a Teflon-lined autoclave or PP bottle. A polyurethane foam (1.5 g) was washed with ethanol and introduced into the polymeric solution previously obtained in order to impregnate said foam with the polymeric solution within the sealed autoclave. Then, a hydrothermal treatment was carried out by using autoclave (polypropylene (PP) bottle or stainless steel autoclave) and the autoclave was kept in a hot air oven which heated at 50° C. for 4 days (ca. 1-4 days). The resin coated polymeric foam was collected by simple filtration, and dried in an oven at 50° C. for 12 h, and then 80° C. for 12 h. The color of the polymeric foam was changed into dark reddish brown. Finally, the impregnated polymeric foam was carbonized at 1000° C. for 1 h under $N_2$ flow in a tubular furnace with the heating rate of 1° C./min.

Figure 1:
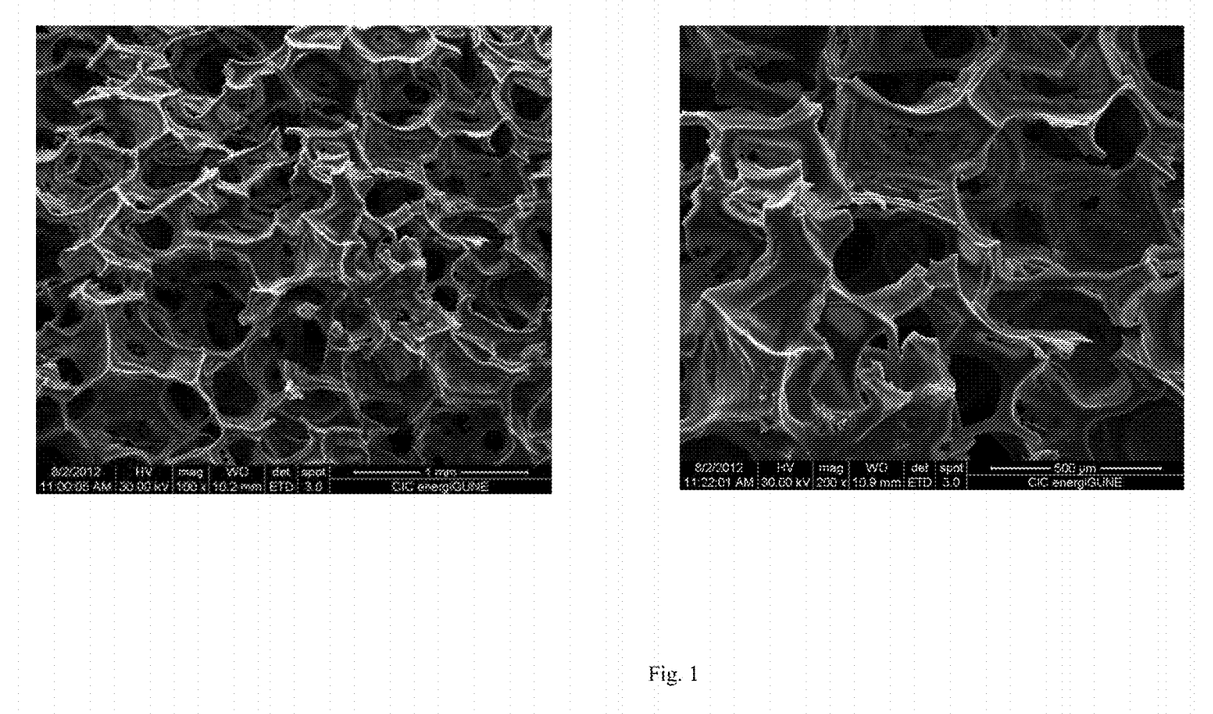
FIG. 1. SEM pictures of carbonized macro and mesoporous carbon foam.
Figure 2:
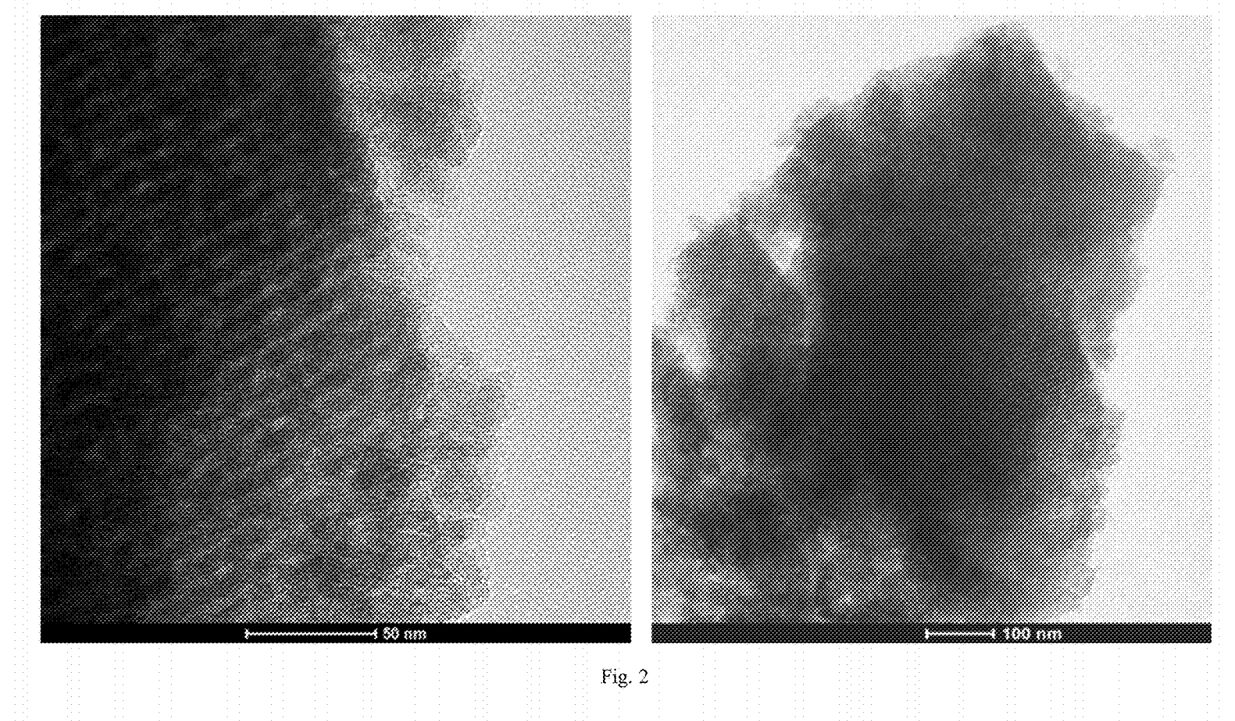
FIG. 2. TEM pictures of carbonized macro and mesoporous carbon foam.
Figure 3:
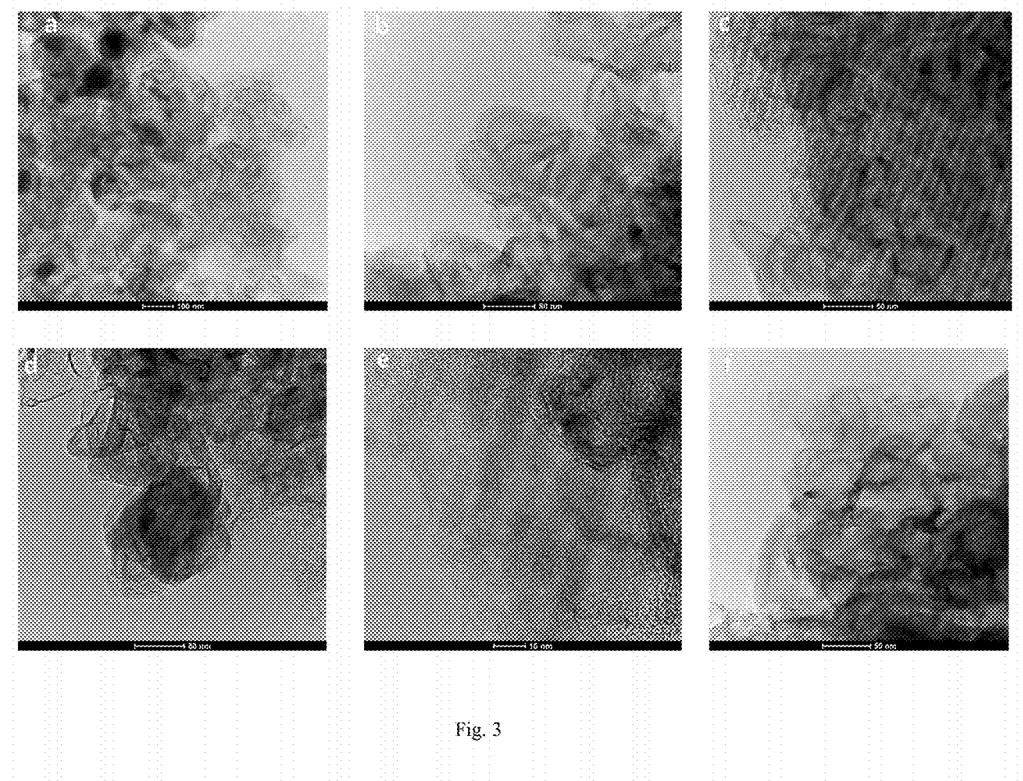
FIG. 3. TEM pictures of graphitized macro and mesoporous carbon foam.

FIG. 1 shows the SEM pictures of the carbonized macro and mesoporous carbon foam evidencing the presence of macroporores in its structure. FIG. 2 shows the TEM pictures of said carbonized macro and mesoporous carbon foam obtained according to this process evidencing the presence of ordered mesopores.

The carbonized macro-mesoporous carbon foam obtained above was impregnated with a solution of iron nitrate in ethanol (3 mmol metal/gC) and then the impregnated carbon foam was graphitized at 1000° C. for 1 h under $N_2$ flow in a tubular furnace with the heating rate of 1° C./min. Finally, the carbon material was washed with HCl (5-10%) solution in order to remove the metal particles.

FIG. 3a-f shows the TEM pictures of the graphitized macro and mesoporous carbon foam obtained according to this process. In this process, iron species in the ethanol medium are easily absorbed on the high surface area of carbon (hydrophobic surface) which contributes to enhance the degree of graphitization during the carbonization process.

Figure 4:
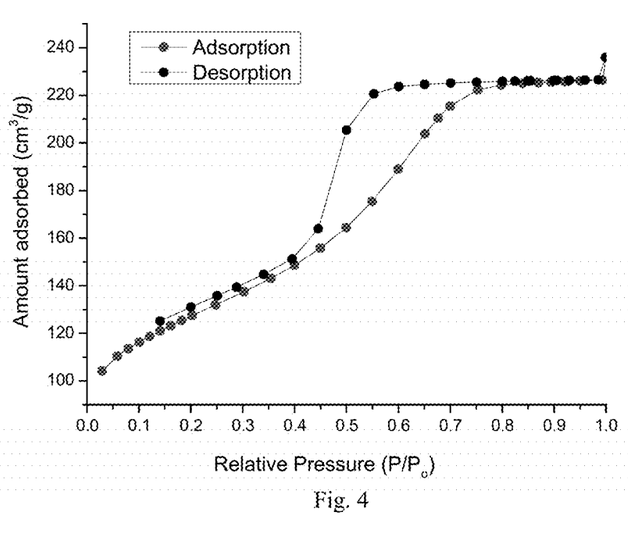
FIG. 4. Nitrogen adsorption and desorption isotherms of graphitized macro and mesoporous carbon foam.
Figure 5:
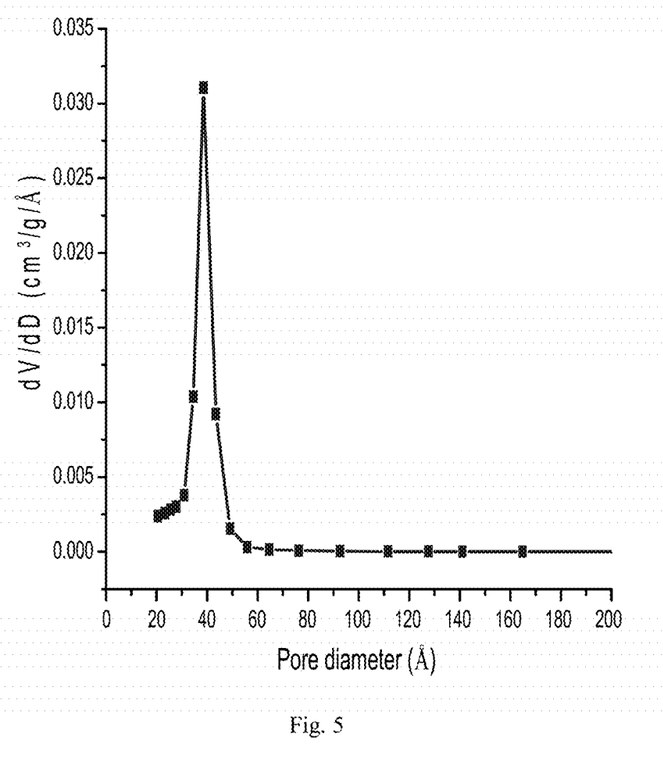
FIG. 5. Pore size distributions of graphitized macro and mesoporous carbon foam.

The results of the nitrogen adsorption-desorption isotherms of the carbon samples are shown in FIGS. 4 and 5.

Figure 6:
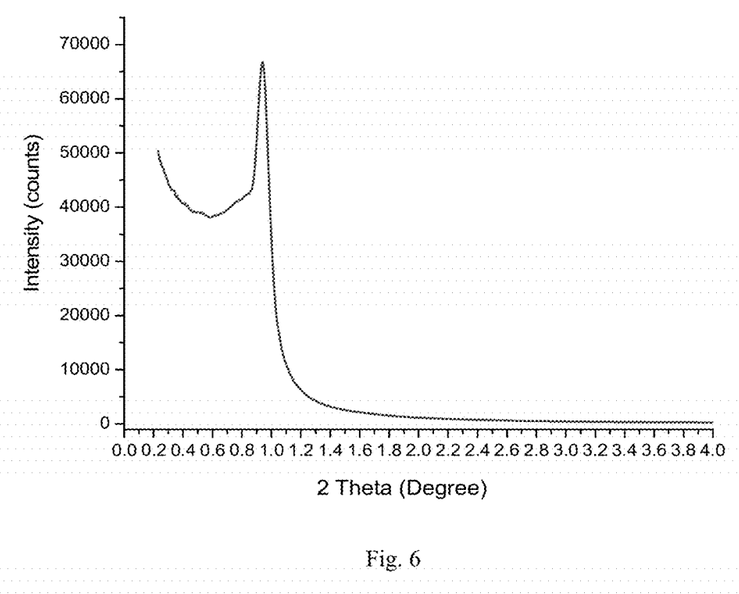
FIG. 6. SAXS pattern of graphitized macro and mesoporous carbon foam.

In addition to that, the small-angle X-ray scattering (SAXS) pattern of the carbon sample is depicted in FIG. 6, which clearly shows the characteristic low-angle peak of a mesoporous material.

Figure 7:
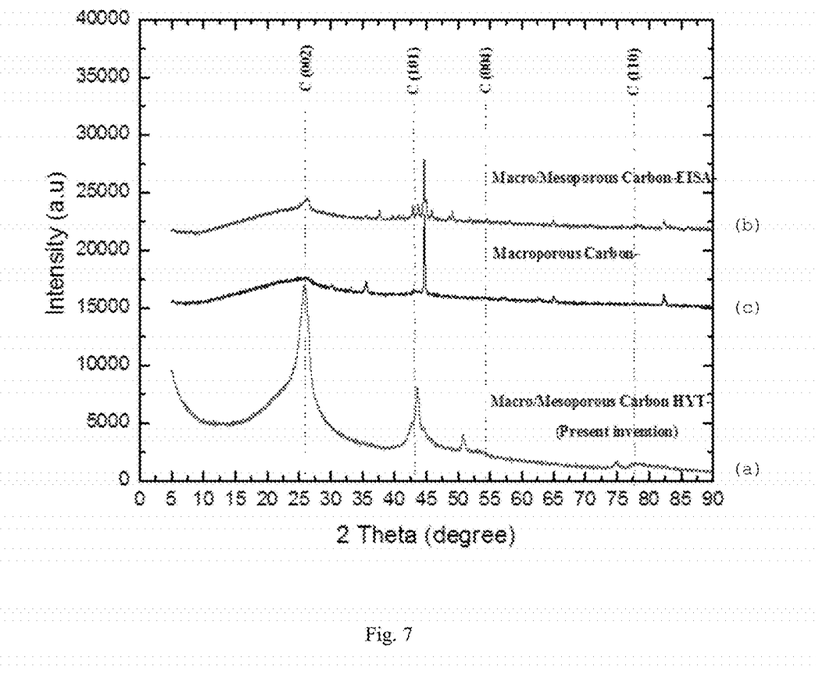
FIG. 7. XRD pattern of graphitized carbon foams: (a) graphitized macro/mesoporous carbon foam obtained according to example 1 of the invention; (b) graphitized macro/mesoporous carbon foam obtained according to comparative example 2; (c) graphitized macroporous carbon foam obtained according to comparative example 2.

Furthermore, the results of X-ray diffraction as depicted in FIG. 7(a) clearly showed a very sharp and higher intensity of peak at 2θ of 26° which confirms the presence of well graphitic structure of the carbon foam.

Example 2 Comparative

Preparation of a Graphitized Macro/mesoporous Carbon Foam and a Graphitized Macroporous Carbon Foam by a Process Comprising the EISA Method and the Addition of a Graphitization Catalyst in the First Step of the Process The degree of graphitization, surface area, pore volume and thermal stability of macro/mesoporous carbon foams obtained following the process described in example 1 have been compared with those of a graphitized macro/mesoporous carbon foam and a macroporous carbon foam obtained by a process comprising: a) the EISA method to conduct the thermopolymerization of the polymer precurosrs, instead of the hydrothermal treatment of example 1; and b) the addition of the iron nitrate in the first step of the process instead of in the last graphitization step.

The preparation procedure is given below.

Resorcinol (1.65 g) and Pluronic F127 (2.5 g) were dissolved in a mixture of 20 ml of water and 20 ml of ethanol and the mixture was stirred for 15 min. Then 0.2 g of 37 wt. % hydrochloric acid was added to the above mixture and stirred for 1 h. 2.5 g of 37 wt. % formaldehyde solution was added drop wise under stirring. The reaction mixture was further vigorously stirred for another 1 h, and a homogeneous solution was obtained.

Then, iron nitrate (3 mmol/gC) was added to the above mixture and stirred for 1 h.

A polyurethane foam (1.5 g) was washed with ethanol and impregnated in the above polymeric mixture which was then transferred into a dish and allowed for solvents evaporation at room temperature. Then, thermopolymerization of the polymer precursors was carried out at 50° C. for 12 hrs and then 80° C. for 12 hours in an oven. Finally, the polymeric foam was carbonized at 1000° C. for 1 h under $N_2$ flow in a tubular furnace with the heating rate of 1° C./min. In this process, graphitization occurs during the carbonization process, so these steps are not separated.

The same procedure has been repeated in the absence of Pluronic F127, thus obtaining a graphitized macroporous carbon foam.

Figure 8:
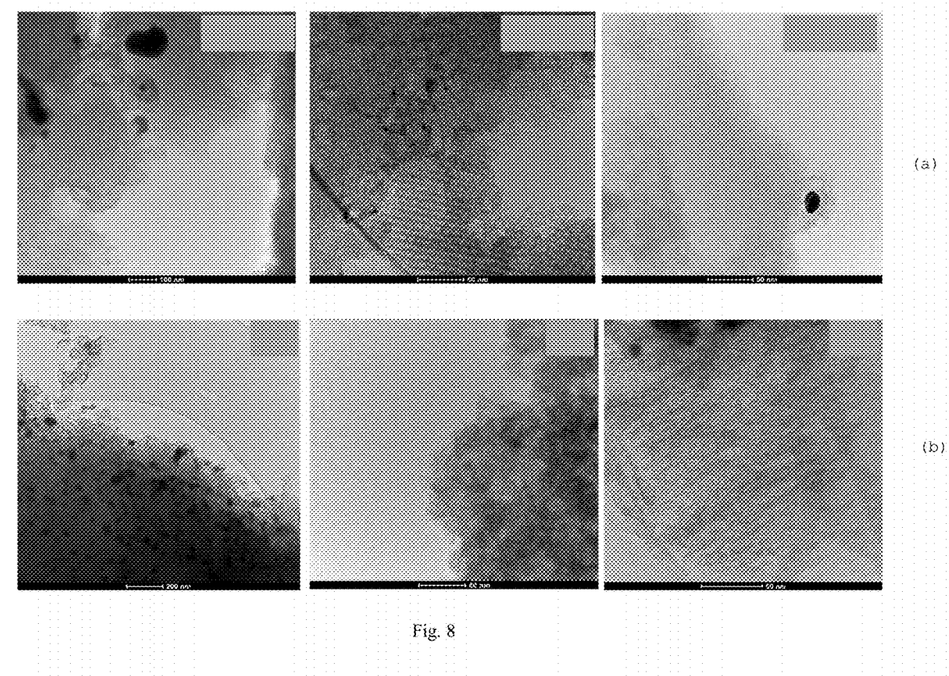
FIG. 8. TEM images of carbon foams: (a) graphitized macro/mesoporous carbon foam obtained according to comparative example 2; (b) graphitized macroporous carbon foam obtained according to comparative example 2.

It can be observed from FIG. 8 that the evaporation induced self-assembly (EISA method) used in the processes of example 2 can favor the formation of bulk iron particles due to agglomeration which are not active catalyst for graphitization. During the solvent evaporation, most of the iron species are not well dispersed in the polymeric mixture and then enhanced the bulk deposition of iron species on the surface of the polymeric foam. During the calcination, bulk deposition of iron species can be converted into bulk iron particles which reduce the degree of graphitization.

Furthermore, the XRD results of macro/mesoporous carbon foam (FIG. 7(b)) and macroporous carbon foam (FIG. 7(c)) clearly demonstrate that these carbon foams have very less degree of graphitization or very less graphitic character.

Example 3 Comparative

Preparation of a Graphitized Macro and Mesoporous Carbon Foam by a Process Comprising the EISA Method and the Addition of a Graphitization Catalyst in the Graphitization Step of the Process The degree of graphitization, surface area, pore volume and thermal stability of macro/mesoporous carbon foams obtained following the process described in example 1 have been compared with those of a graphitized macro/mesoporous carbon foam obtained by a process comprising: a) the EISA method to conduct the self-assembly of the phenolic resin and the polyalkylene oxide compound, instead of the hydrothermal treatment of example 1; and b) the addition of the iron nitrate in the last graphitization step as in the process of the invention.

The preparation procedure is given below.

Resorcinol (1.65 g) and Pluronic F127 (2.5 g) were dissolved in a mixture of 20 ml of water and 20 ml of ethanol and the mixture was stirred for 15 min. Then 0.2 g of 37 wt. % hydrochloric acid was added to the above mixture and stirred for 1 h. 2.5 g of 37 wt. % formaldehyde solution was added drop wise under stirring. The reaction mixture was further vigorously stirred for another 1 h, and a homogeneous solution was obtained.

A polyurethane foam (1.5 g) was washed with ethanol and impregnated in the above polymeric mixture which was then transferred into a dish and allowed for solvents evaporation at room temperature. Then, thermopolymerization of the polymer precursors was carried out at 50° C. for 12 hrs and then 80° C. for 12 hours in an oven. Finally, the polymeric foam was carbonized at 1000° C. for 1 h under $N_2$ flow in a tubular furnace with the heating rate of 1° C./min.

The carbonized foam was impregnated with a solution of iron nitrate in ethanol (3 mmol/gC) and then, the impregnated carbon foam was graphitized at 1000° C. for 1 h under $N_2$ flow in a tubular furnace with the heating rate of 1° C./min. Finally, the carbon material was washed with HCl (5-10%) solution in order to remove the metal particles.

The properties of the graphitized carbon foam obtained from the process described in examples 1-3 are summarized in Table I.

| | Surface Area (m2/g) | Mesopores Volume (cm3/g) | Mesopores Average Diameter (nm) | Thermal Stability in air (° C.) |
|---|---|---|---|---|
| Example 1 (graphitized macro/mesoporous carbon foam of the invention) | 445 | 0.35 | 3.87 | 520 |
| Example 2 (graphitized macro/mesoporous carbon foam) | 259 | 0.25 | 5.90 | 450 |
| Example 2 (graphitized macroporous carbon foam) | 130 | 0.11 | 4.45 | 440 |
| Example 3 (graphitized macro/mesoporous carbon foam) | 380 | 0.22 | 5.19 | 520 |

It is derivable from the experimental data, that the process of the invention provides a graphitized macro/mesoporous carbon foam having higher surface area, higher pore volume and lower average pore size, which contributes to a higher electrical and thermal conductivity, while maintaining or improving the thermal stability.

The invention claimed is:

1. A hierarchical graphitized carbon foam, the carbon foam prepared by impregnating a polymeric foam with a solution comprising a phenolic resin and a poly(alkylene oxide) compound, the carbon foam comprising an interconnected macroporous structure, the interconnected macroporous structure formed by macropores having an average size of at least 50 nm, with an ordered mesoporous wall structure, the ordered mesoporous wall structure having mesopores with a pore size ranging from 2 nm to 50 nm, wherein the carbon foam has a surface area higher than 400 $m^2/g$.

2. The carbon foam according to claim 1, wherein the macropores have a diameter ranging from 50 μm to 1 mm.

3. The carbon foam according to claim 1, wherein the mesopores have a pore size ranging from 2 to 10 nm.

4. A process for preparing a hierarchical graphitized carbon foam as defined in claim 1, wherein said process comprises:
  a) forming a solution comprising a phenolic resin and a poly(alkylene oxide) compound;
  b) impregnating a polymeric foam with the solution obtained in step a);
  c) conducting a self-assembly of the phenolic resin and the poly(alkylene oxide) compound in the polymeric foam by a hydrothermal treatment;
  d) subjecting the product obtained in step c) to a heating process to thermally crosslink the phenolic resin;
  e) subjecting the product obtained in step d) to a carbonization process to remove the poly(alkylene oxide) compound and the polymeric foam and to form a carbonized carbon foam;
  f) subjecting the carbonized carbon foam obtained in step e) to a catalytic graphitization;
wherein the carbonized carbon foam comprises an interconnected macroporous structure, the interconnected macroporous structure formed by macropores having an average pore size of at least 50 nm, with an ordered mesoporous wall structure, the ordered mesoporous wall structure has mesopores with a pore size ranging from 2 nm to 50 nm, and wherein the carbon foam has a surface area higher than 400 m²/g.

5. The process according to claim 4, wherein the phenolic resin used in step a) is the product resulting from the reaction of a phenol, or a substituted phenol, with an aldehyde.

6. The process according to claim 5, wherein the substituted phenol is a polyhydric phenol selected from pyrocatechol, resorcinol, hydroquinone and phloroglucinol; a monoalkyl or polyalkyl substituted phenol selected from cresols and xylenols; a monoacyl or polyacyl substituted phenol; a monoalkoxyl or polyalkoxyl substituted phenols; or a halogen-substituted phenol.

7. The process according to claim 5, wherein the aldehyde is formaldehyde.

8. The process according to claim 4, wherein the poly(alkylene oxide) is an amphiphilic poly(alkylene oxide) block copolymer.

9. The process according to claim 4, wherein the polymeric foam is a polyurethane foam.

10. The process according to claim 4, wherein the hydrothermal treatment in step c) is conducted at autogeneous pressure and at a temperature ranging from 40 to 200° C.

11. The process according to claim 4, wherein the catalytic graphitization is conducted in the presence of a catalyst selected from Fe, Co, Ni, Mn and salts thereof.

12. The process according to claim 4, wherein the catalytic graphitization is conducted at a temperature ranging from 700° C. to 1000° C. in an inert or air-excluded atmosphere.

13. The process according to claim 4, wherein the catalytic graphitization comprises the impregnation of the carbonized macro and mesoporous carbon foam obtained in step e) with a solution of metal nitrates in a solvent.

* * * * *